US005572197A

United States Patent [19]

Matsumoto

[11] Patent Number: 5,572,197

[45] Date of Patent: Nov. 5, 1996

[54] LOST CALL DETECTION DISPLAY PAGER WITH REPEAT CALL DISCRIMINATION CAPABILITY

[75] Inventor: Mariko Matsumoto, Tokyo, Japan

[73] Assignee: NEC Corporation, Tokyo, Japan

[21] Appl. No.: 233,521

[22] Filed: Apr. 26, 1994

[30] Foreign Application Priority Data

Apr. 26, 1993 [JP] Japan .................................... 5-099668

[51] Int. Cl.[6] ........................................................ H04Q 7/00

[52] U.S. Cl. ................................ 340/825.44; 340/825.47

[58] Field of Search ......................... 340/825.44, 825.47, 340/825.48, 311.1; 455/38.4

[56] References Cited

U.S. PATENT DOCUMENTS 4,713,808 12/1987 Gaskill et al. ..................... 340/825.44
5,185,604 2/1993 Nepple et al. ..................... 340/825.44

FOREIGN PATENT DOCUMENTS 2101779 1/1983 United Kingdom ............. H04B 1/06
2253503 9/1992 United Kingdom ............. H04B 5/04

*Primary Examiner*—Michael Horabik
*Assistant Examiner*—Edward Merz
*Attorney, Agent, or Firm*—Sughrue, Mion, Zinn, Macpeak & Seas

[57] ABSTRACT

From a paging station a radio display pager receives a sequence of repeat calls and non-repeat calls. Each of the repeat and non-repeat calls contains a message and a message number identifying the message, the same message numbers being repeated for the repeat calls of the sequence. The message numbers of received calls are stored in a first memory. A currently received call is compared with each of the previously stored calls to detect a mismatch. Upon detection of the mismatch, a lost call detector determines the message number of a lost call which may exist between the currently received call and a call stored last in the first memory. The determined message number is stored into a second memory as a lost message number. The stored lost message number is erased if a call bearing the same message number is received. The lost message number that remains in the second memory is put on display to allow the owner of the pager to inform the system center of the lost message number to obtain the lost message.

9 Claims, 3 Drawing Sheets

FIG. 4

| | ORDER OF ARRIVAL | MESSAGE NUMBER | STEPS | DATA |
|---|---|---|---|---|
| CASE 1 | 1 | #1 | 20~23, 29 | Np = 1 |
| | 2 | #2 | 21~26, 29 | Np = 2 |
| | 3 | #3 | 21~26, 29 | Np = 3 |
| | 4 | [#4] | 21~26, 29 | Np = 4 |
| | 5 | #5 | | |
| | 6 | #6 | 21~29 | Np = 6, LMN = 5 |
| | 7 | [#4] | 21~25 | Np = 6, LMN = 5 |
| | 8 | #7 | 21~26, 29 | Np = 7, LMN = 5 |
| | 9 | #8 | 21~26, 29 | Np = 8, LMN = 5 |
| CASE 2 | 1 | #1 | 20~23, 29 | Np = 1 |
| | 2 | #2 | 21~26, 29 | Np = 2 |
| | 3 | #3 | 21~26, 29 | Np = 3 |
| | 4 | [#4] | | |
| | 5 | #5 | 21~29 | Np = 5, LMN = 4 |
| | 6 | [#4] | 21~27, 30 | Np = 5 |
| | 7 | #6 | 21~26, 29 | Np = 6 |
| | 8 | #7 | 21~26, 29 | Np = 7 |
| CASE 3 | 1 | #1 | 20~23, 29 | Np = 1 |
| | 2 | #2 | 21~26, 29 | Np = 2 |
| | 3 | #3 | 21~26, 29 | Np = 3 |
| | 4 | [#4] | | |
| | 5 | #5 | | |
| | 6 | [#4] | 21~26, 29 | Np = 4 |
| | 7 | #6 | 21~29 | Np = 6, LMN = 5 |
| | 8 | #7 | 21~26, 29 | Np = 7, LMN = 5 |

LEGEND: [ ] REPEAT CALL

LOST CALL DETECTION DISPLAY PAGER WITH REPEAT CALL DISCRIMINATION CAPABILITY

BACKGROUND OF THE INVENTION

1. Field of the Invention

The present invention relates generally to selective calling radio display pagers, and more particularly to a radio display pager for a paging system where repeat call transmissions are provided as a system option and all messages are identified with a serial message number.

2. Description of the Related Art

In radio display paging systems, it is the usual practice to send a calling signal by multiplexing messages and the address codes of the message destinations in a frame format. Because of the inability of the paging receiver to acknowledge receipt of a message, a paging system such as the European Radio Message System provides repeat call transmissions as a system option to ensure against possible transmission errors. To enable receivers to identify individual messages, a serial number is attached to all messages. However, due to transmission errors, some of the transmitted calls are disrupted and the messages contained in the calls fail to reach the destination users. If a non-repeat call is lost, an unfavorable situation can occur if the message contained in the lost call is important to the parties concerned. It is therefore desirable to identify the lost call and allow the destination user to communicate the lost message number to the system center to obtain the lost message.

However, due to the presence of repeat calls where the same message number and message are retransmitted, a loss of a single repeat call must be precisely discriminated against a loss of a non-repeat call.

SUMMARY OF THE INVENTION

It is therefore an object of the present invention to provide a radio display pager capable of precisely discriminating a loss of a single repeat call and a loss of a non-repeat call.

According to the present invention, a radio display pager is provided which comprises a receiver for receiving from a paging station a sequence of repeat calls and non-repeat calls addressed to the radio pager. Each of the repeat and non-repeat calls contains a message and a message number identifying the message, and the message numbers of the repeat calls of the sequence are equal to each other. The pager includes a first memory for storing the message numbers of calls received in sequence by the receiver, and a second memory. A currently received call is compared with each of the previously stored calls to detect a mismatch. Upon detection of the mismatch, a lost call detector determines the message number of a lost call which may exist between the currently received call and a call stored last in the first memory, and stores the determined message number into the second memory as a lost message number. The stored lost message number is erased if a call bearing the same message number is received. The lost message number that remains in the second memory is put on display.

More specifically, the lost call detector comprises a first detector responsive to the detection of a mismatch by the mismatch detector for detecting the presence of a lost call when there is a difference of at least one between the message number of a call currently received by the receiver and the message number of a call stored last in the first memory. A second detector is responsive to the detection of a lost call by the first detector for detecting a match or a mismatch between the message number of the currently received message and a message number stored in the second memory. A third detector is responsive to the detection of a lost call by the second detector for detecting a message number which exists between the message number of the currently received call and the message number of the call last stored in the first memory and storing the detected message number into the second memory and responsive to the detection of a match by the second detector for removing from the second memory a message number which is equal to the message number of the currently received call.

BRIEF DESCRIPTION OF THE DRAWINGS

The present invention will be described in further detail with reference to the accompanying drawings, in which:

FIG. 4 is a list of example cases for a sequence of calls and corresponding steps respectively performed by the controller.

DETAILED DESCRIPTION

Figure 1:
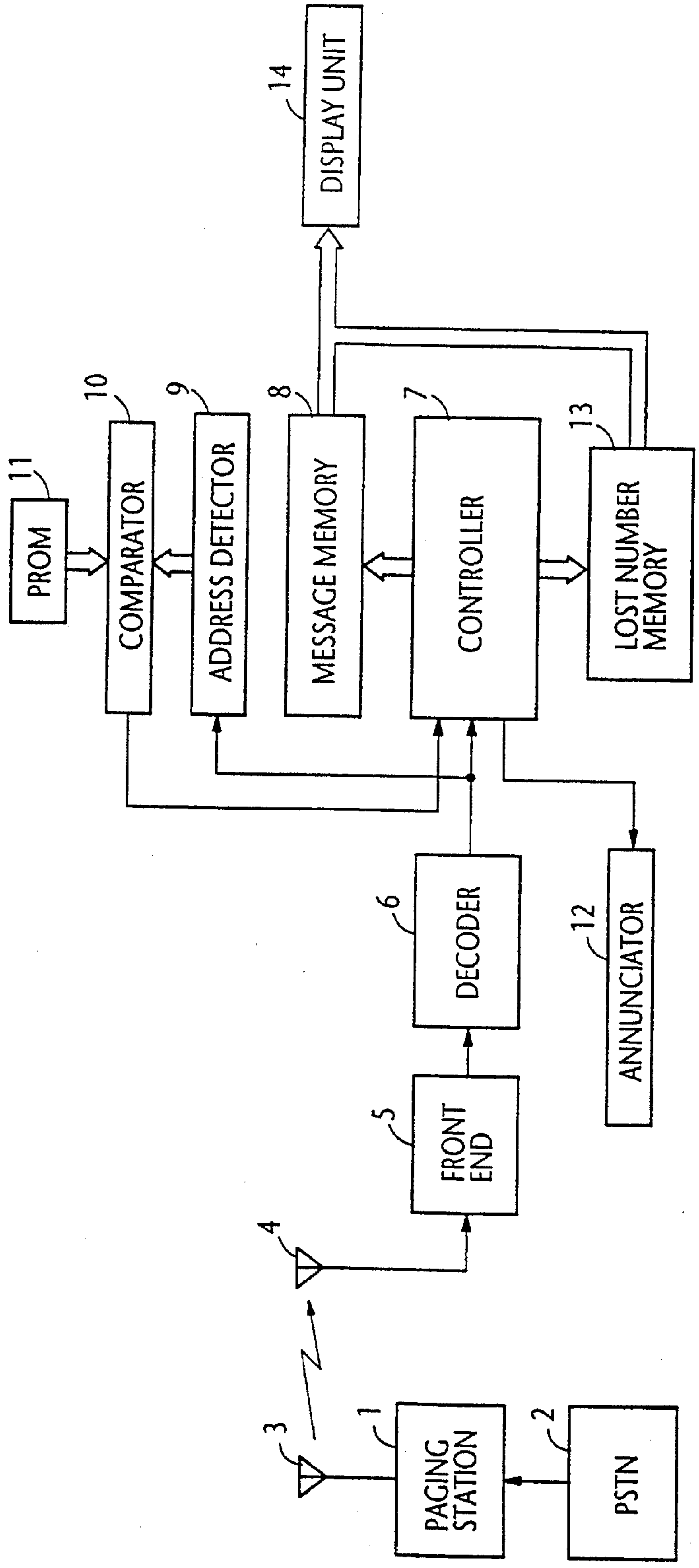
FIG. 1 is a block diagram of a radio paging system comprising a paging station and a paging receiver of the present invention.

Referring now to FIG. 1, there is shown a radio paging communication system according to the present invention. A paging station 1 is connected to a public switched telephone network 2 to receive a calling signal including the telephone number of a calling network user and the telephone number of a destination paging user. The paging station has an attendant system at the system center, where it answers the request call to receive a message from the requesting user and sends a calling signal in a frame format. The frame signal is preceded by a preamble, followed by a word synchronization field and requesting user telephone numbers, destination telephone numbers, messages from the requesting users and message numbers identifying the messages. After conversion to a digital signal of a prescribed coding format, such as BCH code, the frame signal is modulated onto a carrier and broadcast from antenna 3. As a service option of the paging system, some of the calling signals are repeatedly transmitted to increase the probability of reception. Repeat calls of the same message bear the same message numbers, so they cannot be discriminated from each other, while non-repeat calls are each uniquely identified by the message number.

At a paging receiver, the transmitted signal is detected at antenna 4 and demodulated by a front end 5 into the baseband signal. The baseband signal is applied to a decoder 6 where the BCH format is decoded, and error detection is performed in a manner known in the art. The output of the decoder is applied to a controller 7 where it is processed. A message memory 8 and a lost number memory 13 are connected to controller 7. An address detector 9 is connected to the output of decoder 6 to store the address code contained in a received call. A comparator 10 makes a comparison between the address code stored in the address detector 9 with the address code of the pager stored in a programmable read-only memory 11. Comparator 10 produces an enable signal if the pager's address matches the address code detected by address detector 9. Controller 7 is responsive to the enable signal from the comparator 10 to start processing on the received call and activates an annunciator 12 to alert the owner when a valid call is received. The message contained in the received call together with the message number are stored in the message memory 8 and a lost message number which may be detected in a manner as will be described is stored in the lost number memory 13. When a call is successfully received, a corresponding message stored in memory 8 is put on display on a display unit 14. As will be described, the lost message number may be erased from the lost number memory 13 if a call of the same message number is received, and the lost message number which remains in the lost call memory 13 is displayed.

Figure 2:
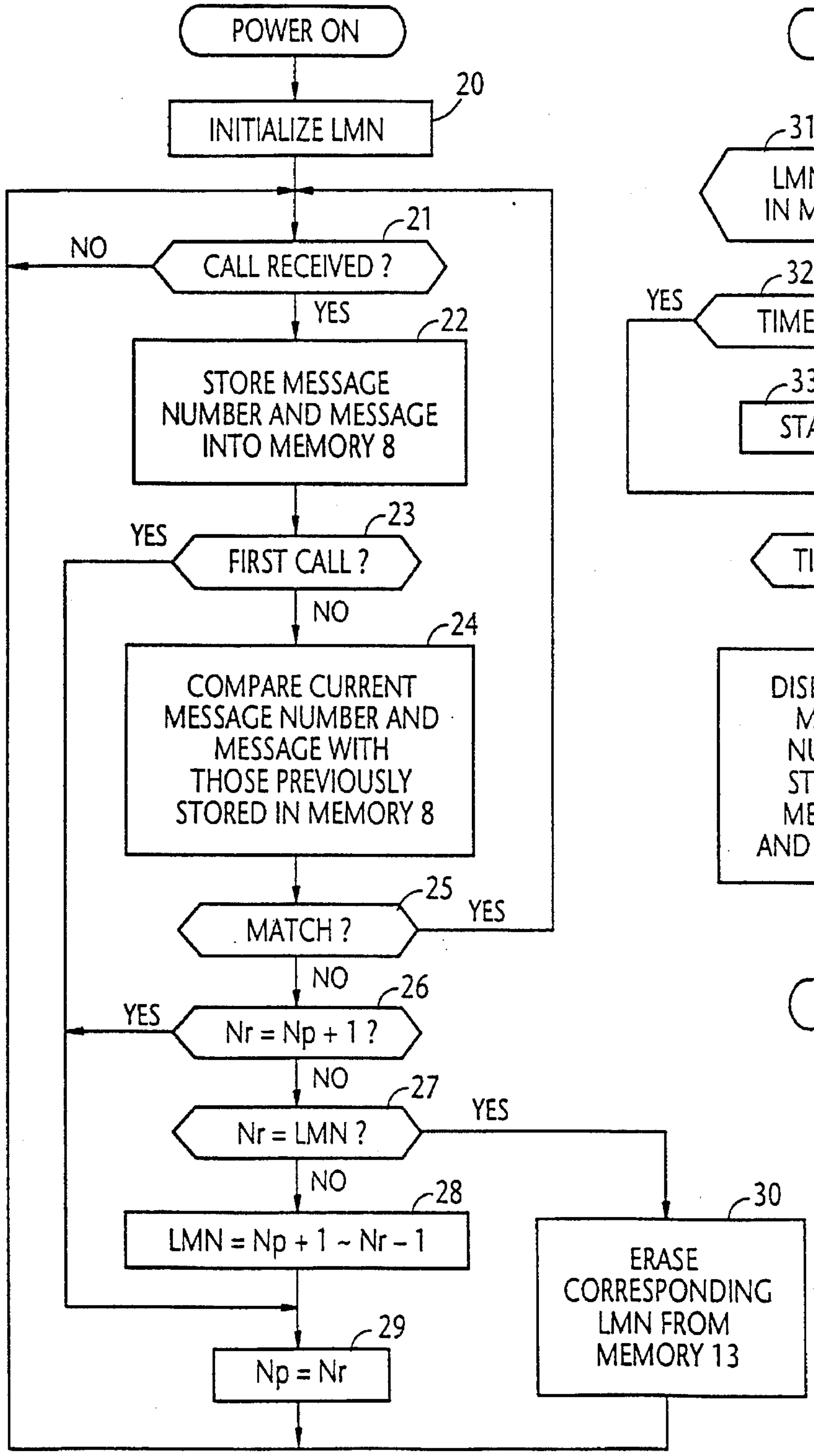
FIGS. 2 and 3 are flowcharts illustrating a sequence of operations performed by the controller of FIG. 1.

Controller 7 is a microprocessor-based controller which is programmed to perform a sequence of instructions as illustrated in FIG. 2. When the pager is energized in response to the operation of a power switch, not shown, the program execution starts with initialization step 20 to initialize the lost number memory 13 in which an LMN (lost message number) value may be stored. Controller 7 monitors the output of the comparator 10 to check to see if a call is received (step 21). If there is one, control branches at step 21 to step 22 to store the message number (Nr) of the received call and the message contained in that call into memory 8 so that a plurality of message numbers will be stored into memory 8. If the current call is the first call (step 23), control proceeds to step 29 to set the present message number Nr to the message number of a call last stored in the memory 8 and returns to step 21.

If the current call is a second or later call (step 23), control branches to step 24 to compare the message number and the corresponding message of the current call with the message number and the corresponding message of each of the calls previously stored in the message memory 8 and proceeds to step 25 to detect a match or a mismatch between them. If a match is detected (step 25), control recognizes that the current call is a repeat call and returns to step 21 to repeat the process. If a mismatch is detected at step 25, control branches to step 26 to determine whether the message number Nr of the current call is equal to the message number Np of a call last stored in memory 8 plus one. If the pager has successfully received a call, the answer at decision step 26 is affirmative and control branches at step 26 to step 29. If the receiver has failed to receive a call, the answer is negative and control branches at step 26 to step 27 to check for the equality of the current message number Nr to a lost message number (LMN) which is stored in the lost number memory 13. If Nr is not equal to LMN, control branches at step 27 to step 28 to store message numbers Np +1 through Nr−1 into the lost number memory 13, i.e., the message number of at least one call which may exist between the current call and the last stored call, and control exits to step 29. If Nr is equal to LMN, control branches at step 27 to step 30 to erase a message number which is equal to the message number of the current call.

Figure 3:
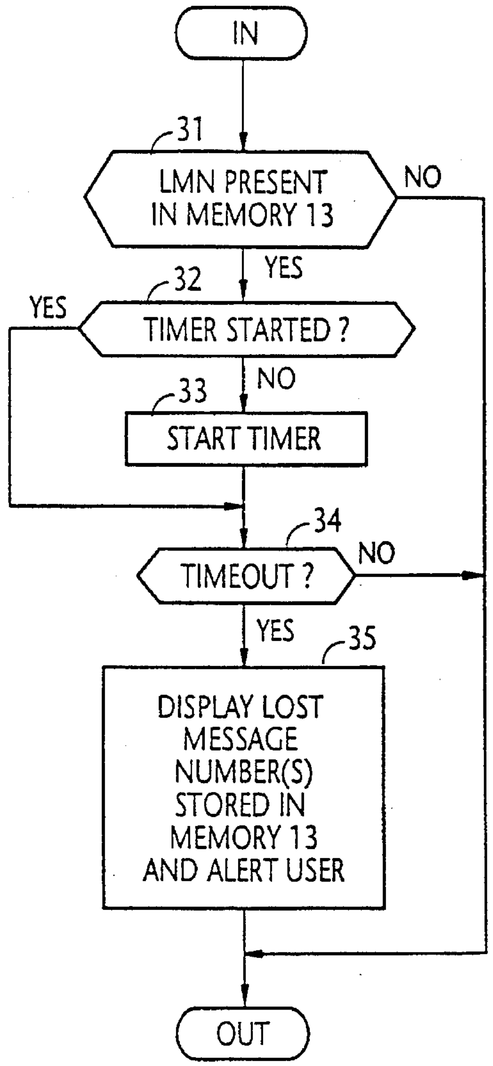

At intervals, the program of FIG. 2 is interrupted by an interrupt routine shown in FIG. 3 to check the lost call memory 13 for the presence of any lost message number. The interrupt routine starts with step 31 which checks to see if a lost message number is present in memory 13. If so, control exits to step 32 to check to see if a timer has been started. If not, control advances to step 33 to start the timer and checks for the expiry of the timer at step 34. If the decision at step 31 or 34 is negative, control exits to the end of the interrupt routine and returns to the main routine. During the timeout period, steps 31, 32 and 34 are executed at intervals to allow a delay time to determine whether the stored lost message number is to be displayed or not. If it is the lost message number of an earlier repeat call, it will be erased during the delay time in response to the arrival of a later repeat call. If a lost message number still exists in the memory 13 at the end of the timeout period, control exits to step 35 to provide a display of the lost message number on the display unit 14, and alert the owner by activating the annunciator 12. On hearing the alert tone, the owner knows that there is a lost call and informs the system's center of the displayed lost message number to receive a corresponding message.

The operation of the controller 7 will be best understood with the following example cases shown in FIG. 4 by assuming that message number 4 is used to transmit repeat calls.

CASE 1

Assume that the paging station is supposed to transmit a sequence of calls #1, #2, #3, #4, #5, #6, #4, #7 and #8 and the receiver fails to receive call #5. At the receiver, reception of call #1 causes control to execute steps 20 to 23 and proceed to step 29 to set the last stored message number Np to 1. Reception of each of calls #2, #3 and #4 causes control to execute steps 21 to 25 and proceed to step 26 where it branches to step 29 and return to step 21, thus setting the last stored call number Np successively to 2, 3 and 4. With Np=4, the arrival of call #6 causes control to proceed through steps 21 to 26 where it determines that Nr is not equal to Np +1, i.e., it recognizes that there is a discontinuity between the current call and the last stored call. Control branches to step 27 to check to see if the current message number Nr is equal to a lost message number LMN stored in the lost number memory 13. Since the memory 13 holds no lost number at this moment, the decision at step 27 is negative and the lost message #5 is stored into memory 13 at step 28 and Np is set equal to 6 at step 29. Arrival of later repeat call #4 causes control to execute steps 21 to 24 and proceed to step 25 where it detects a match with the earlier repeat call #4 and returns to step 21. Thus, the Np value remains at 6 and the lost call number #5 remains in the memory 13. In response to receipt of call #7, control executes steps 21 to 25, and proceeds to step 26. Since Nr=7 and Np=6, control branches at step 26 to step 29 where Np is now set equal to 7. Similar events occur in response to receipt of call #8. Since the lost message number #5remains in the memory 13 after the expiry of the delay time of the interrupt routine, it is detected and displayed on the display unit 14.

CASE 2

Assume that the receiver fails to receive the earlier repeat call #4. Upon arrival of call #5, control proceeds through steps 21 to 29, setting the lost message number 4 to LMN and the current message number 5 to Np. In response to receipt of the later repeat call #4, control executes steps 21 to 26 and proceeds to step 27 because of its discontinuity with the preceding call #5, and advances to step 30 to erase the corresponding lost message number 4 from memory 13. Since step 29 is not executed, the Np value remains at 5. When the next call #6arrives, control executes steps 21 to 25 and proceeds to step 26. Since Nr=6and Np=5, control branches at step 26 to step 29. The same steps as performed on call #6are performed on the next call #7. Although the lost message number #4is stored temporarily in memory 13, it is erased in response to the arrival of later repeat call #4during the delay time of the interrupt routine.

CASE 3

Assume that the earlier repeat call #4and non-repeat call #5are lost in succession. In such instances, the arrival of the later repeat call #4 causes control to execute steps 21 to 25 and proceed to step 26. Since Nr =4and Np=3, the decision at step 26 is affirmative, and Np is set equal to 4 at step 29. Arrival of the next call #6causes control to execute steps 21 to 25, and proceed to step 26 where it makes a negative decision and proceeds to step 27 where it makes a negative decision. Steps 28 and 29 are executed, setting LMN equal to 5 and Np to 6. In response to the next call #7, control proceeds through step 21 to step 26 where it branches to step 29. The lost message number #5remains in memory 13 and displayed.

What is claimed is:

1. A radio display pager comprising:

receiver means for receiving from a paging station a sequence of repeat calls and non-repeat calls addressed to the radio pager, each of said repeat and non-repeat calls containing a message and a message number identifying the message, the message numbers of repeat calls containing identical messages being equal to each other;

first memory means for storing the message numbers of calls received by the receiver means;

second memory means;

mismatch detector means for comparing a call currently received by the receiver means with each of the calls previously stored in the first memory means for detecting a mismatch therebetween;

lost call detector means responsive to the detection of a mismatch by the mismatch detector means for detecting the message number of a lost call which may exist between a call currently received by the receiver means and a call stored last in the first memory means storing the detected message number into the second memory means as a lost message number, and removing from the second memory means the lost message number when a call having the same message number is received by the receiver means; and display means for displaying the message number which remains in said second memory means.

2. A radio display pager as claimed in claim 1, wherein said lost call detector means comprises:

first detector means responsive to the detection of a mismatch by the mismatch detector means for detecting the presence of a lost call when there is a difference of at least one between the message number of a call currently received by the receiver means and the message number of a call stored last in the first memory means;

second detector means responsive to the detection of a lost call by the first detector means for detecting a mismatch between the message number of the currently received message and a message number stored in the second memory means; and third detector means responsive to the detection of a lost call by the second detector means for determining a message number which exists between the message number of the currently received call and the message number of the call last stored in the first memory means and storing the determined message number into the second memory means as said lost message number, and responsive to the detection of a match by the second detector means for removing from the second memory means said lost message number which is equal to the message number of a call received by the receiver means.

3. A radio display pager as claimed in claim 1, wherein said lost call detector means comprises:

first means, responsive to the detection of a mismatch by the mismatch detector means, for detecting a match or a mismatch between the message number of the currently received call and a lost message number stored in the second memory means when the message number of a call currently received by the receiver means is not equal to the message number of a call stored last in the first memory means plus one; and second means, responsive to the detection of said mismatch by the first means, storing every sequential number residing between the message number of the currently received call and the message number of the call last stored in the first memory means into the second memory means as said lost message number, and responsive to the detection of said match by the first means for removing from the second memory means a lost message number which is equal to the message number of a call received by the receiver means.

4. A radio display pager as claimed in claim 1, wherein said lost call detector means is a microprocessor programmed to perform the steps comprising:

(a) detecting a mismatch when the message number of a call currently received by the receiver means is not equal to the message number of a call stored last in the first memory means plus one in response to the detection of a mismatch by the mismatch detector means;

(b) detecting a match or a mismatch between the message number of the currently received call and a lost message number stored in the second memory means, in response to the detection of said mismatch by the step (a); and (c) storing every sequential number residing between the message number of the currently received call and the message number of the call last stored in the first memory means into the second memory means as said lost message number in response to the detection of said mismatch by step (b), and removing from the second memory means a lost message number which is equal to the message number of a call received by the receiver means in response to the detection of said mismatch by step (b).

5. A radio pager receiving messages having associated message numbers and storing the received messages and the associated message numbers in a memory, said radio pager comprising a microprocessor programmed to perform the functions comprising:

determining whether a match exists between an associated message number of a currently received message and associated message numbers previously stored in the memory;

when no match is found, deciding that a message has not been lost when the associated message number of the currently received message equals a reference number defined as an associated message number of a last previously stored message plus one, and deciding that a message has been lost otherwise;

storing as a lost message number every sequential number residing between the associated message number of the currently received message and the reference number.

6. The radio pager of claim 5, wherein said microprocessor is programmed to further perform the following functions:

determining whether a match exists between the associated message number of the currently received message and a previously stored lost message number, and deleting the previously stored lost message number when a match exists.

7. The radio pager of claim 6, wherein said microprocessor is programmed to further perform the following functions:

starting a timer when it is determined that a lost message number is stored in the memory and, when the timer has counted a predetermined period, displaying the lost message number which is still stored in the memory.

8. A method for detecting and managing lost messages in a radio pager receiving messages having associated message numbers, comprising the steps of:

comparing the associated message number of a presently received message with associated message numbers of previously received and stored messages;

storing as a lost message number any consecutive number residing between the associated message number of the currently received message and a reference number defined by a last previously stored associated message number plus one;

erasing a stored lost message number that is equal to the associated message number of the presently received message.

9. The method according to claim 8, further comprising the steps of:

starting a timer when it is detected that a lost message number is stored in a memory of said radio pager;

alerting the user that a lost message number exists if it is determined that a lost message number is stored in the memory after the timer has reached a predetermined count.

* * * * *